United States Patent

[11] 3,556,200

| | | |
|---|---|---|
| [72] | Inventor | Louis H. Leonard, Jr.<br>Dewitt, N.Y. |
| [21] | Appl. No. | 784,724 |
| [22] | Filed | Dec. 18, 1968 |
| [45] | Patented | Jan. 19, 1971 |
| [73] | Assignee | Carrier Corporation<br>Syracuse, N.Y.<br>a corporation of Delaware |

[54] HEATING AND COOLING SYSTEM
4 Claims, 1 Drawing Fig.

[52] U.S. Cl. .................................................. 165/2,
165/62
[51] Int. Cl. ..................................................... F25b 15/06,
F25b 27/00
[50] Field of Search .......................................... 165/62, 63,
2; 62/159, 141, 476, 101

[56] References Cited
UNITED STATES PATENTS

| 2,853,276 | 9/1958 | Anderson, Jr. ............... | 165/62 |
| 3,153,441 | 10/1964 | Pippert et al. ................. | 165/62X |

Primary Examiner—William E. Wayner
Attorneys—Harry G. Martin, Jr. and Raymond Curtin

ABSTRACT: An absorption refrigeration system having a cooling and a heating mode of operation. A generator, an air cooled condenser, a two-stage air cooled absorber, a two-stage adiabatic evaporator and an air conditioning fan coil unit are connected to provide cooling. The system has means for automatically adjusting the concentration of refrigerant and absorbent in accordance with low ambient absorber temperatures. A heating mode of operation is provided wherein absorbent solution is heated in the generator and passed through the fan coil unit back to the generator to supply heat to a space being conditioned.

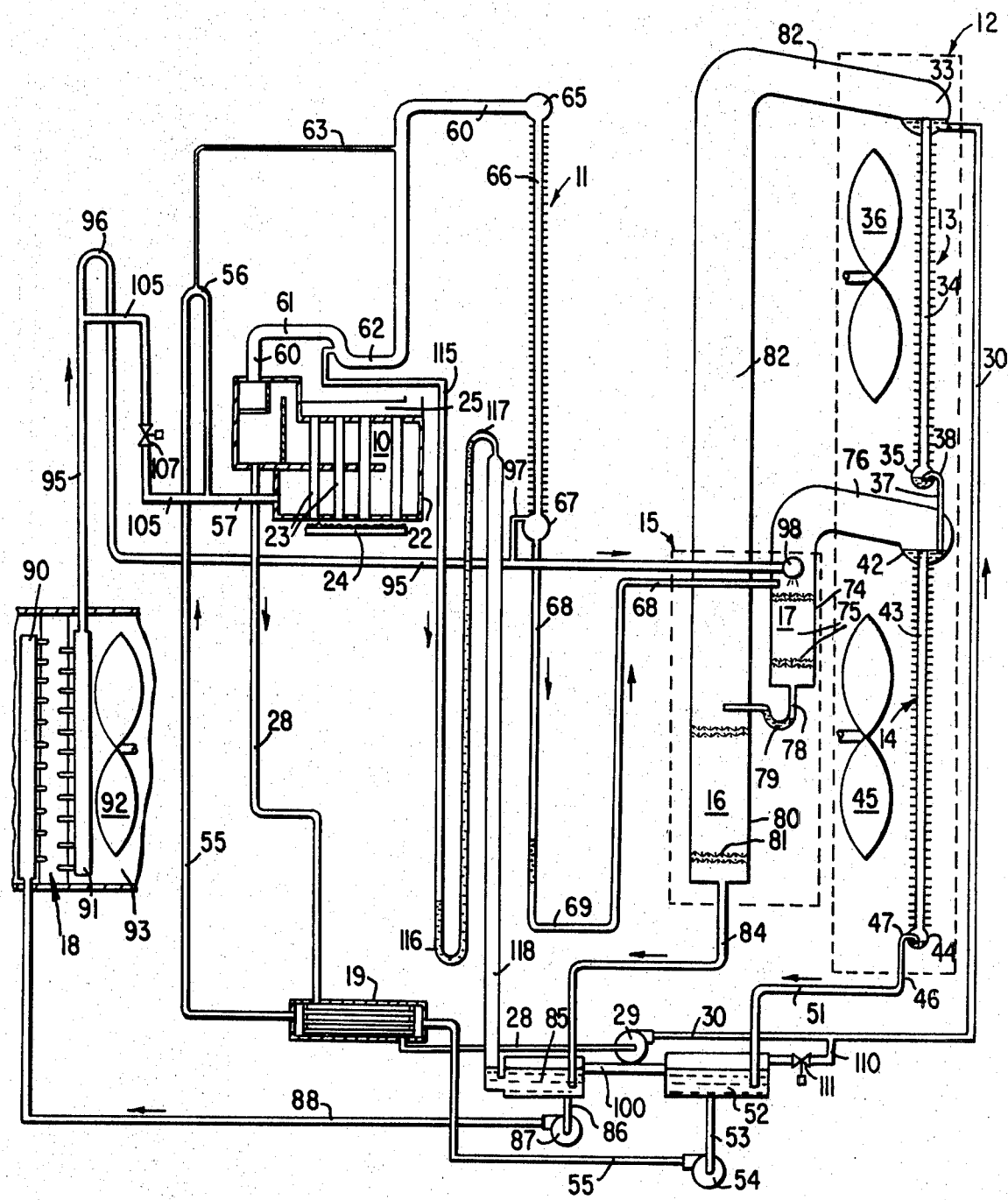

HEATING AND COOLING SYSTEM

BACKGROUND OF THE INVENTION

This invention relates to heating and cooling absorption systems which are capable of providing either refrigeration or heating. Such systems generally utilize a conventional absorption refrigeration cycle in the cooling mode of operation. In the heating mode of operation, absorbent solution is frequently boiled in the generator to form refrigerant vapor which is condensed in the evaporator to heat fluid passing through the evaporator. Alternatively, some systems use a revere cycle arrangement wherein the heat rejected from the condenser is used to provide heat. Such prior systems possess a number of disadvantages which adversely affect their reliability, economy and desirablitity.

These prior heating systems necessitated boiling an absorbent solution in the generator for supplying refrigerant vapor to heat a desired location by condensing the vapor. Because the absorbent solution was usually an aqueous salt, as lithium bromide, which elevates the boiling temperature, it was necessary to heat the solution to a temperature substantially higher than the temperature at which the resulting steam was condensed to provide heating. Typically, it has been necessary to heat a solution of fifty percent lithium bromide to a temperature of 280° F. in order to produce steam which will condense at a temperature of only about 125° F. Operating the generator during the winter heating season at such a temperature is likely to increase the formation of relatively noncondensible gases in the system and may increase generator corrosion if continued over an extending period of time. In addition, the unit must be purged of relatively noncondensible gases in the heating mode of operation as well as in the cooling mode in order to condense the water vapor to supply heat. Reverse cycle heating systems also suffer because the heating capacity is limited by the refrigeration capacity. Under conditions of low ambient temperatures, below the freezing point of the refrigerant water, a danger exists with prior systems that the water may condense and form ice which will either damage the heat exchange tubes in the evaporator or at other locations to which it may undesirably migrate, or will clog return passages in the machine resulting in a malfunction. Similarly, a power failure which terminated heating might result in freezing of either refrigerant or absorbent solution or both and render the system inoperative without servicing.

In accordance with this invention, these disadvantages of prior heating-cooling absorption systems are overcome by providing a new heating mode of operation.

SUMMARY OF THE INVENTION

An absorption machine is provided having a cooling cycle comprising a generator, a condenser, an absorber, an evaporator and a heat absorbing heat exchanger. The refrigerant is cooled in the evaporator and passed in heat exchange relation with the region to be cooled by means of the heat absorbing heat exchanger. On the heating mode of operation, the passage of fluid through the system is rearranged so that the absorbent solution is mixed with the refrigerant and heated in the generator. The heated mixture is circulated through a suitable heat rejecting heat exchanger to provide heat to a desired region and is returned to the generator for reheating. Preferably, the heat absorbing heat exchanger of the cooling mode is the same as the heat rejecting heat exchanger of the heating mode.

The heating cycle of this invention relies solely on sensible rather than latent heat transfer to the region being heated. Consequently, the temperature throughout the heating cycle is low, on the order of about 125° F., thereby reducing corrosion and avoiding the production of relatively noncondensible gases in the system. Reducing noncondensible gases simplifies changeover to the cooling mode because less purging is required. Furthermore, since the heating cycle of this invention does not rely on a condensation process, it is unnecessary to purge the system during winter heating. The danger of freezing of the absorbent or refrigerant is largely eliminated and the system can safely be located in low ambient temperatures because the preferred absorbent and refrigerant are mixed together to form a mixture having a low-freezing point compared with that of pure refrigerant or strong absorbent solution and which contracts upon freezing.

BRIEF DESCRIPTION OF THE DRAWING

The drawing is a schematic flow diagram, partially in cross section, of a heating and cooling system in accordance with this invention showing certain liquid levels in the cooling mode of operation.

DESCRIPTION OF THE PREFERRED EMBODIMENT

This invention will be described with respect to a preferred embodiment wherein a two-stage adiabatic refrigerant evaporator and a two-stage air cooled absorber are employed in cooling mode of operation. However, this invention may be employed in systems having any number of either adiabatic or nonadiabatic evaporator stages.

The preferred refrigerant is water and the preferred absorbent is an aqueous solution of lithium bromide, although other absorbent-refrigerant combinations, especially those including a lithium halide salt, may be employed instead. As used herein, a concentrated solution of lithium bromide which is strong in absorbing power will be referred to as "strong" solution and a dilute solution of lithium bromide which is weak in absorbing power will be referred to as "weak" solution. Likewise, pure water will be referred to as "concentrated refrigerant" and refrigerant water having lithium bromide therein will be referred to as "dilute refrigerant". A heat transfer promoting additive, such as 2-ethyl-$n$-hexanol, may be added to the absorbent solution.

Referring to the drawing, the system comprises a generator 10, a condenser 11, an absorber 12 having a low-pressure stage 13 and a high-pressure stage 14, an adiabatic evaporator 15 having a low-temperature stage 16 and a high-temperature stage 17, an air-conditioning heat exchanger 18 and a solution heat exchanger 19. Heat exchanger 18 provides sensible heat exchange between cold liquid refrigerant and air being conditioned when the system is connected to provide refrigeration. In such operation, heat exchanger 18 functions as a heat absorbing heat exchanger. Heat exchanger 18 is illustrative of the preferred remote type of heat exchanger which is suitable for the adiabatic evaporator system illustrated. If a nonadiabatic conventional evaporator is employed, heat exchanger 18 may be located in the evaporator.

Generator 10 comprises a shell 22 having a plurality of fire tubes 23 extending therethrough. A suitable heat source, such as a fuel burner 24, discharges hot gas through fire tubes 23. Flue gas collector 25 is arranged above the fire tubes and is connected to an exhaust flue. Other types of generators, such as those employing steam or hot water as a heating fluid, may be alternatively utilized.

Weak absorbent solution is supplied to generator 10 and boiled therein to concentrate the solution in the cooling mode of operation. The resulting strong absorbent solution passes through strong solution passage 28 and the shell side of solution heat exchanger 19 to strong solution pump 29. The strong solution is pumped through strong solution passage 30 to low-pressure vapor header 33 disposed at the top of low-pressure absorber stage 13.

Low-pressure absorber stage 13 comprises a plurality of vertically disposed finned absorber heat exchange tubes 34 connected at their upper ends by a low-pressure vapor header 33 and at their lower ends by a low-pressure liquid header 35. Strong solution overflows the open upper ends of absorber tubes 34 and passes downwardly along the interior surface of the absorber tubes while absorbing refrigerant vapor therein. The heat of the absorption process is rejected to ambient air passed over the exterior surfaces of absorber tubes 34 by fan 36. The absorbent solution is somewhat diluted by absorption of refrigerant vapor in tubes 34, so that the solution collected in low-pressure liquid header 35 is of intermediate concentration. The intermediate solution passes through siphon tube 37 having an upwardly arched portion 38 into high-pressure vapor header 42 of high-pressure absorber stage 14.

High-pressure absorber stage 14 comprises a plurality of finned vertical absorber heat exchange tubes 43 joined at their upper ends by high-pressure vapor header 42 and at their lower ends by high-pressure liquid header 44. Intermediate absorbent solution overflows the upper open ends of absorber tubes 43 and passes downwardly along the interior surfaces of the absorber tubes while refrigerant vapor is being absorbed therein. The heat of the absorption process is rejected from high-temperature absorber stage 14 to ambient air passed over the exterior surfaces of absorber tubes 43 by fan 45.

Absorbent solution passing downwardly through absorber tubes 43 is further diluted by the absorption of refrigerant vapor therein so that the absorbent solution collected in high-pressure liquid header 44 is weak in absorbing power. The weak solution passes from low-pressure liquid header 44 through a siphon tube 46 having an upwardly arched portion 47 through weak solution passage 51 into weak solution sump 52. The weak solution then passes from weak solution sump 52 through weak solution passage 53 to weak solution pump 54. The weak solution is then pumped through weak solution passage 55 and the interior tubes of solution heat exchanger 19 through an upwardly extending loop 56, and weak solution passage 57 into generator 10 for reconcentration.

Refrigerant vapor is formed in generator 10 by the boiling of absorbent solution. This refrigerant vapor passes from generator 10 to condenser 11 through refrigerant vapor passage 60. Refrigerant vapor passage 60 has an upwardly extending loop 61 and a downwardly extending loop or trap 62 therein, which are free of liquid in the cooling mode. A vent line 63 vents the upper portion of loop 56 to the condenser pressure in passage 60.

Refrigerant condenser 11 comprises a plurality of vertical finned tubes 66 connected at their upper ends by refrigerant vapor header 65 and at their lower ends by refrigerant condensate header 67. Preferably, condenser 11 is located to receive air passing over the tubes in absorber 12 in order to utilize the absorber fans for passage of cooling air over the condenser. The refrigerant condensate formed in condenser 11 passes from header 67 through condensate passage 68 having a downwardly extending loop or trap 69 into high-temperature evaporator stage 17 of adiabatic refrigerant evaporator 15.

High-temperature evaporator stage 17 preferably comprises a shell 74 having a suitable packing material 75 to provide an extended mass and heat transfer surface. A vapor passage 76 extends between high-temperature evaporator stage 17 and vapor header 42 of high-pressure absorber stage 14. A small quantity of refrigerant is evaporated from refrigerant passing through evaporator stage 17, thereby flash cooling the remaining refrigerant. The cooled refrigerant passes from high-temperature evaporator stage 17 to low-temperature evaporator stage 16 through refrigerant passage 78 having a downwardly extending trap 79.

Low-temperature evaporator stage 16 preferably comprises a shell 80 having suitable packing material 81 therein and a refrigerant vapor passage 82 communicating with vapor header 33 of low-pressure absorber 13. As in the preceding stage, a small quantity of refrigerant is evaporated in low-temperature evaporator stage 16 which results in flash cooling the remainder of refrigerant passing therethrough. In all, only about 1 percent of the total refrigerant flowing through adiabatic evaporator 15 need be evaporated to satisfactorily flash cool the remaining 99 percent. It is preferred to employ an adiabatic evaporator in which the refrigerant is flash cooled and no external heat is added; however, a conventional single or multistage evaporator having a heat absorbing heat exchanger therein may be employed, if desired.

The cold refrigerant then passes from low-temperature evaporator stage 16 through refrigerant passage 84 into refrigerant sump 85. The cold refrigerant passes from sump 85 through refrigerant passage 86 to pump 87 and is pumped through passage 88 to inlet header 90 of heat absorbing heat exchanger 18. Heat exchanger 18 may comprise an air-conditioning fan coil unit having an inlet header 90, an outlet header 91 and a fan 92 for passing air to be conditioned through the fan coil unit located in duct 93. Heat exchanger 18 passes cold liquid refrigerant in heat exchange relation with the air passing thereover to cool the air which constitutes a refrigeration load in the cooling mode of operation. After absorbing heat from the air being cooled, the warmed liquid refrigerant passes through refrigerant passage 95 having an upwardly extending loop 96 and restricted spray nozzle 98 back to high-temperature evaporator stage 17 of adiabatic evaporator 15 for recooling of the refrigerant. Bleed passage 97 is provided to pass a small quantity of the returning liquid refrigerant into liquid condensate header 67.

A refrigerant reconcentration and vapor pressure control passage 100 extends between sumps 85 and 52 as shown in the drawing. This passage serves to adjust the concentration and vapor pressure of refrigerant and absorbent solution in the system under various operating conditions as will be explained subsequently.

A heating passage 105 communicates with passage 95 at a point below the top of upwardly arched loop 96. A mode control valve 107 is disposed in passage 105 which communicates at its other end with generator 10 through passage 57. Another heating passage 110 having a mode control valve 111 therein communicates between discharge of solution passage 30 and absorbent sump 52. A third heating passage 115 has an upper end connected between upwardly arched portion 61 and downwardly arched portion 62 of passage 60. Passage 115 has a downwardly extending loop 116 and an upwardly extending loop 117 therein. The downward leg 118 of upwardly extending loop 117 is connected to refrigerant sump 85 and is of larger diameter than the legs of loop 116 to prevent siphoning of loop 116.

BASIC COOLING MODE OPERATION

When the system is in the cooling mode of operation, mode control valves 107 and 111 are closed and the liquid levels are approximately as shown in the drawing. Loop 116 is filled with sufficient liquid to balance the pressure difference between generator 10 and refrigerant sump 85 to prevent passage of vapor therebetween. During operation, strong absorbent solution from generator 10 serially passes through tubes 34 and 43 of absorber stages 13 and 14 absorbing refrigerant vapor generated in adiabatic evaporator stages 16 and 17 respectively. Weak absorbent solution is returned from absorber 15 via weak solution sump 52 by weak solution pump 54 to generator 10 for reconcentration. A low-vapor pressure is maintained in absorber stages 13 and 14 by rejecting the heat of the absorption process into air passing over the exterior of the absorber tubes. Refrigerant condensate from condenser 11 and warm liquid refrigerant from heat exchanger 18 are passed first through a high-temperature evaporator stage 17 and then through low-temperature evaporator stage 16 to adiabatically flash cool the refrigerant. The cold refrigerant is circulated by pump 87 through heat exchanger 18 to cool air passing through duct 93. At or above design ambient absorber temperature, the refrigerant circulated through evaporator 15 and heat exchanger 18 is preferably substantially pure water and the strong absorbent solution concentration is preferably about 64.5 percent lithium bromide by weight.

HEATING MODE OPERATION

To switch from the cooling mode of operation to the heating mode, control valves 107 and 111 are opened. Operation of pumps 54 and 29, and fans 36 and 45, is discontinued. Opening of valve 107 causes the fluid passing through passage 95 from heat exchanger 18 to be diverted into passage 105 because passage 105 and connecting passage 57 is below the top of loop 96 which is above the top of loop 61. Generator 10 and loops 61 and 62 are flooded with a mixture of refrigerant and absorbent solution by pump 87. The liquid level in passage 60 is below the junction of vent line 63 and below the top of loop 96.

It is preferred that all of the refrigerant and absorbent solution in the system be mixed together to form weak heating solution when the system is in the heating mode. The preferred range of concentration is between about 50 percent and about 30 percent lithium bromide, having a solidification temperature below about −40° F., which is substantially lower than that of pure refrigerant (32° F.) or strong 64.5 percent solution (110° F.), thereby effectively preventing freezing damage to the system at any normally incurred ambient temperatures. If freezing protection to only 0° F. is required, the concentration of the solution may range between about 20 percent to about 55 percent lithium bromide. Further freezing protection is afforded because the preferred mixtures contract upon solidifying so that damage to the system is rendered unlikely.

The solution is preferably heated in generator 10 to about 125° F. which is sufficient to provide winter heating from heat exchanger 18 having a size which is designed to accommodate the refrigeration capacity of the system. The preferred temperature however is below the temperature at which the solution in the generator will boil, because of the liquid head imposed on the generator by loop 61. The solution in loop 61 is relatively cooler than that in the generator because of heat exchange with ambient atmosphere which inhibits boiling or vaporization in the loop.

A major portion of the heated solution (90 percent) passes upwardly through loop 61 into heating passage 115. The level of the heated solution is above the level of upwardly extending loop 117 and it will flow by gravity through passage 115 through downwardly extending leg 118 into refrigerant sump 85. The heated solution passes from refrigerant sump 85 through passage 86 and is pumped by pump 87 via passage 88 through the heat exchanger 18. Heat exchanger 18 in the heating mode operation operates as a heat rejecting exchanger, thereby warming air passing through duct 93 and cooling the solution. The cooled solution passes from heat exchanger 18 through passages 95, 105 and 57 back to generator 10 for reheating. A minor portion (10 percent) of the solution heated in generator 10 continues to pass downwardly through passage 28, the shell side of heat exchanger 19, through inoperative pump 29, passages 30 and 110, into absorbent sump 52, and through control passage 100 into refrigerant sump 85, from which it passes to heat exchanger 18, as previously described.

It will be seen that in the heating mode of operation, most of the locations in the system at which a substantial quantity of refrigerant accumulates are flushed out by heating solution or can be drained to minimize the likelihood of damage to the system by freezing at low ambient temperatures. At the same time, however, passage of solution through the condenser, evaporator and absorber is terminated in order to prevent loss of heat at these locations.

TRANSITION FROM HEATING TO COOLING MODE OPERATION

When it is desired to terminate heating and return to the cooling mode of operation, mode control valves 107 and 111 are closed. Pumps 54 and 29, and fans 36 and 45 are again energized. Closing of valve 107 terminates direct flow of solution from heat exchanger 18 to generator 10. Instead, solution is pumped from heat exchanger 18, through upwardly extending loop 96 and passage 95, and serially through high-temperature evaporator 17 and low-temperature evaporator 16 of adiabatic evaporator 15. The solution in generator 10 is heated to the boiling temperature to concentrate the solution. The level of solution in the generator drops so that vapor passage 60 is free of liquid and loop 116 is sealed but no longer passes solution.

Vapor formed in generator 10 is condensed in condenser 11 and passes through refrigerant liquid passage 68 into high-temperature evaporator section 17 and thence into low-temperature evaporator section 16. The condensate then passes through passage 84 into refrigerant sump 85 from which it is pumped by pump 87 through heat exchanger 18.

In time, if the ambient absorber temperature is above the design condition, the concentration of refrigerant in the fluid pumped through heat exchanger 18 will increase due to the addition of pure refrigerant condensate from condenser 11.

Strong absorbent solution formed in generator 10 will pass through passage 28, heat exchanger 19 and passages 28 and 30 to absorber 12. From there, the absorbent solution will pass serially through low-pressure absorber stage 13 and high-pressure absorber stage 14 into absorbent sump 52 and be returned to generator 10 by pump 54 where it will be concentrated. Thus, at absorber ambient temperatures above the design temperature, the absorbent solution circulating in the system will increase in absorbent concentration as the absorbent solution is concentrated by boiling in the generator.

The volume of strong absorbent solution passing to sump 52 will decrease as refrigerant is boiled from it in the generator, and the level of solution in sump 52 will tend to drop. Conversely, the quantity of refrigerant passing through evaporator 15 will increase due to the refrigerant added to the refrigerant circuit from condenser 11, and the level of refrigerant in sump 85 will tend to rise. When the level of refrigerant in sump 85 tends to exceed the level of absorbent solution in sump 52, some refrigerant, contaminated with absorbent solution from the heating mode of operation, will flow through refrigerant reconcentration and vapor pressure control passage 100 into absorbent sump 52 to balance the liquid levels in the two sumps. The vertical elevations of sumps 85 and 52 are preferably arranged so that the solution levels in the two sumps are each at the level of passage 100 when sump 85 contains virtually pure refrigerant and sump 52 contains strong solution concentrated to the maximum design operating condition concentration.

At ambient absorber temperature above design conditions, absorbent contaminated refrigerant will continue to be bled from sump 85 into sump 52 until the refrigerant has been substantially concentrated and the absorbent solution has been concentrated to the desired full load design operating concentration.

While it is preferred to achieve the reconcentration of the refrigerant in the manner previously described for reasons related to low ambient temperature operation, alternate reconcentration means may be employed if desired. For example, refrigerant reservoir 85 may be located at a normally higher elevation than solution reservoir 52 so that a suitably restricted passage between the reservoir will continuously bleed some refrigerant into the absorbent circuit for concentration in the generator. The bleeding of the refrigerant may be stopped by valve means when the refrigerant concentration has reached a desired nearly pure refrigerant condition which can be determined by a concentration sensor responsive to some condition, such as density or volume of solution or refrigerant in sumps 52 or 85.

As the two concentrations increase by separation of absorbent and refrigerant from each other, increased refrigeration capacity can be obtained from the system. Eventually, full refrigeration capacity is reached at high ambient absorber temperature when the refrigerant and absorbent solution are fully concentrated. While only partial refrigeration capacity is achieved in the interim period, under practical conditions, full capacity is not needed just after the system has experienced a demand for heating. Consequently, the system is able to handle normal demands for both heating and cooling to provide satisfactory air-conditioning throughout the entire year.

COOLING MODE OPERATION AT LOW AMBIENT TEMPERATURE

It has been seen that the system when switching from heating to cooling at ambient absorber temperatures above design operating conditions, will completely separate the absorbent solution from the refrigerant. Often, however, the refrigeration system is called upon to operate at ambient temperatures which are below the predetermined design absorber ambient temperature which may be about 95° F. This is particularly true during spring and fall where a need to switch from heating to cooling and back again would be most probably encountered.

If the ambient temperature of air passed over absorber 12 is less than the design temperature, the process of concentrating the absorbent solution and the refrigerant will stop at some intermediate concentration where an equilibrium is reached between absorber capacity and refrigeration demand. From then on, the concentration of absorbent and refrigerant will adjust itself to provide a variable vapor pressure effect which just balances refrigeration load against absorber capacity.

To explain how this variable vapor pressure and variable solution concentration effect works, assume that the refrigeration system is operating at an ambient temperature slightly above the design temperature at which the refrigerant and absorbent solution are fully concentrated. If the ambient absorber temperature drops, the temperature of the absorbent solution passing through absorber tubes 34 and 43 will also drop. The decreased temperature of the absorbent solution will result in a decreased absorber vapor pressure and therefore the capacity of the absorber to absorb water vapor will increase. Consequently, the quantity of water vapor evaporated in evaporators 16 and 17 will begin to increase in order to satisfy the increased absorber capacity. This greater quantity of water vapor being absorbed in the absorber will reduce the final concentration of weak absorbent solution leaving absorber 12 through passage 51. Therefore, the volume of solution discharge from line 51 into absorbent sump 52 will increase because of the additional refrigerant absorbed in the solution. The increased volume of weak solution tends to cause the level of the absorbent solution to rise in sump 52. Also, the volume of refrigerant discharged into refrigerant sump 85 is decreased due to the greater quantity of refrigerant evaporated. This tends to decrease the refrigerant level in refrigerant sump 85. As the level of weak solution in 52 and sump 52 tends to increase above the level of refrigerant in sump 85, absorbent solution will begin to flow from sump 52 through vapor pressure control passage 100 into the refrigerant sump 85 to balance the liquid levels in sumps 52 and 85.

The passage of absorbent solution from absorbent sump 52 to refrigerant sump 85 will continue until the level of the liquids in the two sumps balance each other for the rate at which the sumps are receiving liquid. This passage of absorbent solution into the refrigerant sump will contaminate or dilute the refrigerant being circulated through heat exchanger 18 to evaporator 15 with absorbent salt. The dilution of refrigerant with the absorbent solution decreases its vapor pressure and increases the evaporation temperature of refrigerant in the adiabatic evaporator stages. The refrigerant concentration continues to be diluted by contamination with additional absorbent salt until the evaporation temperature in the evaporator stages 16 and 17 rises back to the desired design evaporator temperature at which the refrigeration load just balances the absorber capacity. Bleed passage 97 prevents flash freezing of refrigerant condensate in passage 68 by diluting the refrigerant with absorbent contaminated refrigerant from passage 95.

If the ambient absorber temperature rises, the refrigerant and absorbent concentration increase to balance each other at the new absorber ambient temperature. The increased absorber temperature reduces the ability of absorber 12 to absorb refrigerant vapor. Thus, the volume of solution passing into weak solution sump 52 decreases due to the weak solution having absorbed less refrigerant vapor. Also, the quantity of refrigerant discharged into refrigerant sump 85 increases due to less refrigerant having been evaporated in evaporator 15. Consequently, the level of solution in sump 52 tends to drop below the level of refrigerant in sump 85 and some of the contaminated refrigerant is bled into the absorbent circuit through vapor pressure control passage 100. The refrigerant rich solution bled through passage 100 passes to generator 10 via lines 55 and 57, and the refrigerant is boiled off and condensed in refrigerant condenser 11. Pure refrigerant condensate from condenser 11 is collected in header 67 and passes through refrigerant condensate line 8 back to evaporator 15. Concentrated absorbent solution is passed back to the absorbent circuit. Eventually, by bleeding contaminated refrigerant from sump 85 into absorbent sump 52, the system will concentrate both the absorbent and the refrigerant until the refrigeration load and absorber capacity balance each other or until the refrigerant is concentrated to substantially pure water.

Thus, the vapor pressure of the refrigerant and the vapor pressure of the absorbent solution automatically and continuously adjust themselves to the refrigeration load and to the ambient absorber temperature to provide the desired refrigeration capacity at the desired chilled water temperature. In a system according to this invention, the refrigerant is always automatically contaminated or diluted with absorbent solution at relatively low ambient absorber temperatures (below design temperature) to an extent that will provide an approximately uniform evaporator temperature or refrigerant boiling point regardless of changes in ambient absorber temperature which would normally result in changing the evaporator temperature.

An air cooled absorption system has been described for purposes of illustration, but it will be apparent that the principles of this invention are equally applicable to a system employing a liquid cooled absorber and condenser. Similarly, while the invention has been described with respect to an air conditioning system employing a fan coil heat exchanger for absorption and rejection of heat in the cooling and heating modes, respectively, the invention is also applicable to water chillers and other types of refrigeration heating systems. Heat exchanger 18 may comprise a heat exchanger disposed in a nonadiabatic evaporator. Separate heat rejecting and heat absorbing heat exchangers may be employed if desired. Refrigerant sump 85 may be made integral with evaporator 15 and solution sump 52 may be combined with absorber 12.

By the practice of this invention, it is possible to provide either heating or cooling as required from an absorption system without employing high temperatures, special corrosion resistant materials and without purging the system during winter operation. Furthermore, problems, such as freezing or condensation of refrigerant or absorbent solution which have beset prior absorption systems operating at low ambient temperatures causing damage or heat loss are overcome. Substantially all of the refrigerant and absorbent solution in the system are mixed together to form a heating medium having excellent antifreeze properties, thereby enabling the location of the system in cold outdoor locations without danger of freezing. The heating capacity may be made largely independent of the cooling capacity for use in cold climates.

While a preferred embodiment of the invention has been described for purposes of illustration, it will be appreciated that the invention may be otherwise embodied within the scope of the following claims.

I claim:

1. A heating and cooling system having a heating mode of operation and a cooling mode of operation, and means to select one of said modes of operation thereof:
   A. said system in the cooling mode of operation comprising a generator for boiling absorbent solution to concentrate said solution, a condenser for condensing refrigerant vapor formed in said generator, an evaporator for evaporating refrigerant condensed in said condenser to provide cooling, an absorber for absorbing refrigerant vapor concentrated in said evaporator into absorbent solution concentrated in the generator, and means connecting said generator, condenser, evaporator and absorber to provide refrigeration;

B. said system in the heating mode of operation comprising means for mixing the absorbent solution and the refrigerant to form a heating liquid, means including said generator for heating said heating liquid, means including a heat rejecting exchanger for passing heated heating liquid in heat exchange relation with a heating load to provide heating, passage means for passing heated heating liquid from the generator through said heat exchanger and back to said generator for reheating therein; and C. concentration control passage means connecting the evaporator and the generator, operative upon switching said system from the heating mode of operation to the cooling mode of operation thereof, for passing a portion of the refrigerant liquid having absorbent solution mixed therewith through said concentration control passage to the generator for separation of refrigerant and absorbent until the refrigerant concentration in the evaporator is sufficient to provide the required refrigeration load, and for reducing the passage of liquid refrigerant to the generator before complete concentration of the refrigerant if the refrigerant reaches a sufficient concentration to provide the required refrigeration load.

2. A heating and cooling system as defined in claim 1 wherein said system includes:
A. an absorbent solution sump for collecting weak absorbent solution from said absorber;
B. a refrigerant sump for collecting refrigerant from said evaporator; and
C. the refrigerant concentration control passage means extending between the refrigerant sump and said absorbent sump, said passage being arranged for passage of liquid from said refrigerant sump to said absorbent sump in response to the relative quantity of absorbent solution passing to said absorber sump and the quantity of refrigerant passing to said evaporator sump.

3. A method of operating a heating and cooling system, said system in the cooling mode of operation thereof containing an absorbent solution and a refrigerant and said system having a generator for boiling absorbent solution to concentrate the solution by vaporizing refrigerant therefrom, a condenser for condensing refrigerant vaporized in said generator, an evaporator for evaporating refrigerant condensed in said condenser to provide cooling, and an absorber for absorbing refrigerant evaporated in said evaporator into absorbent solution concentrated in said generator; wherein the method of providing heating when said system is in the heating mode of operation comprises:

A. mixing the absorbent solution and the refrigerant to form a heating liquid;
B. heating liquid absorbent solution in said generator;
C. passing heated liquid absorbent solution from said generator through a heat exchange in heat exchange relation with a heating load to provide heating thereto;
D. passing absorbent solution from said heat exchanger to said generator for reheating therein; and wherein the method of providing cooling comprises:
E. switching said system from the heating mode of operation to the cooling mode of operation;
F. passing a quantity of refrigerant having absorbent mixed therewith present in said system after switching from heating to the cooling mode of operation, to the generator for separation of refrigerant therefrom, and mixing the separated refrigerant with the remaining refrigerant so as to increase the refrigerant concentration of the remaining refrigerant; and
G. reducing the quantity of refrigerant passed to said generator if the refrigerant concentration reaches a sufficient concentration to provide the desired refrigeration capacity prior to complete concentration thereof.

4. A heating and cooling system as defined in claim 1 wherein said heat rejecting heat exchanger of the heating mode of operation comprises a heat absorbing heat exchanger of the cooling mode; said refrigerant comprising water; said absorbent solution comprising a lithium halide; and wherein said system includes:
A. a refrigerant sump for collecting cooled, unevaporated liquid refrigerant from said evaporator when the system is in the cooling mode of operation;
B. passage means associated with said refrigerant sump for passing cooled liquid refrigerant from said liquid sump to said heat absorbing heat exchanger when said system is in the cooling mode of operation;
C. passage means for passing liquid refrigerant from said heat absorbing heat exchanger back to said evaporator for cooling therein when said system is in the cooling mode of operation;
D. passage means for passing heated absorbent solution from said generator to said refrigerant sump, for passage to said heat rejecting heat exchanger when said system is in the heating mode of operation, thereby diluting the absorbent solution circulating in said system and forming an absorbent solution having a lower freezing temperature than the pure refrigerant or strong solution; and
E. passage means for passing liquid absorbent solution from said heat rejecting heat exchanger to said generator for heating therein when said system is in the heating mode of operation.